May 9, 1961 H. B. KALMAR ET AL 2,983,898
TERMINAL WIRE CRIMP AND METHOD FOR FORMING SAME
Filed Oct. 4, 1957 2 Sheets-Sheet 1

INVENTOR.
Harold B. Kalmar
Harold R. Conter
BY Edward I. Coulon

Attys.

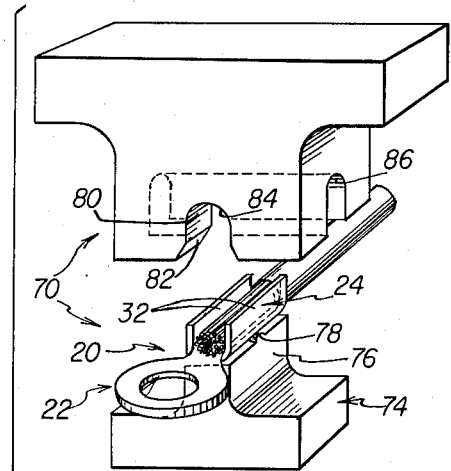
FIG. 10
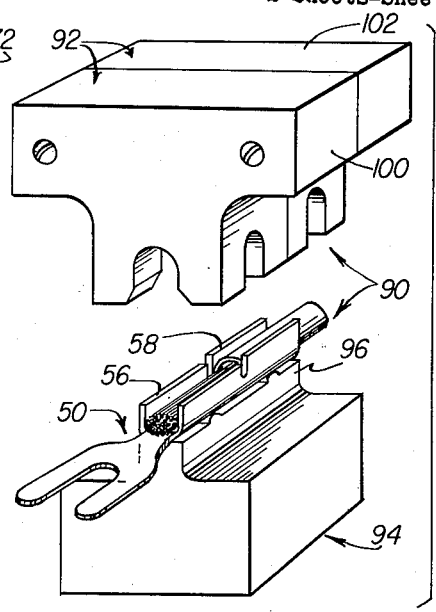
FIG. 12
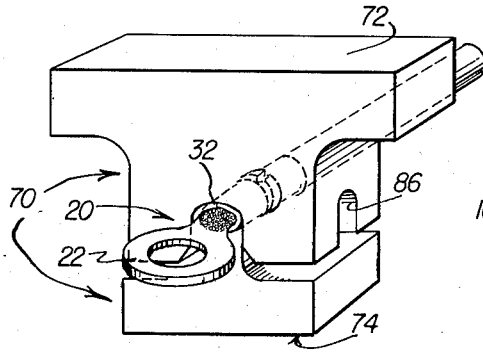
FIG. 11
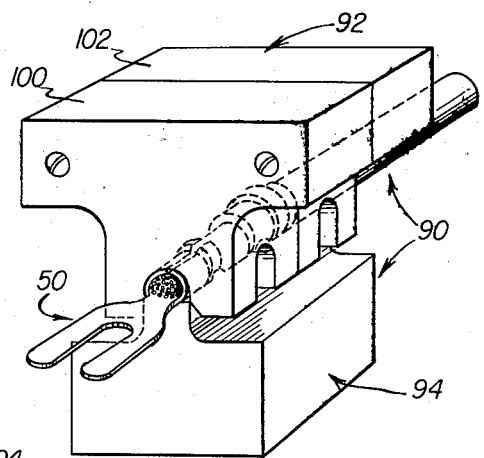
FIG. 13
FIG. 14
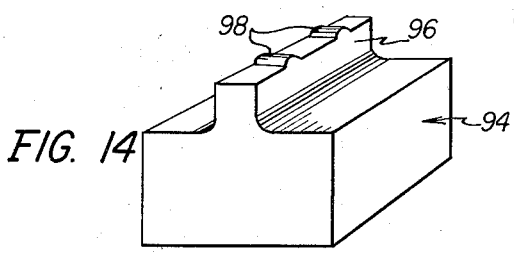
FIG. 15
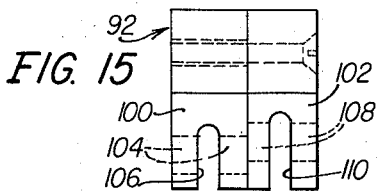
INVENTORS
Harold B. Kalmar
Harold R. Conter
Edward I. Coulon
BY Byron Hume Green & Clement
Attys.

United States Patent Office 2,983,898
Patented May 9, 1961

2,983,898
TERMINAL WIRE CRIMP AND METHOD FOR FORMING SAME

Harold B. Kalmar, Chicago, Harold R. Conter, Franklin Park, and Edward I. Coulon, Chicago, Ill., assignors to Malco Manufacturing Company, Chicago, Ill.

Filed Oct. 4, 1957, Ser. No. 688,347

7 Claims. (Cl. 339—223)

This invention relates to terminal connectors for electric wires. More particularly, the invention relates to wire crimps for securing the terminals to the wires and to the method for forming the wire crimps.

Most electrical terminal connectors are secured to wires by soldering or by forming a crimp about the wire which reduces the wire cross section and drastically deforms the individual strands of a stranded wire. Often such wire crimps of the prior art provide tabs which actually pierce the wire and thereby reduce its tensile strength. A major difficulty of such wire crimps has been the fact that the wire will often pull out of the crimped section upon application of a force less than the ultimate tensile strength of the wire. In some cases the wire is so weakened at the crimped area that it will break upon application of a force less than the tensile strength of the undisturbed wire.

Accordingly, it is an object of the present invention to provide an improved terminal wire crimp.

Another object of the invention is to provide a terminal wire crimp in which the wire is not weakened at the area of crimping.

A further object of the invention is to provide a terminal wire crimp in which the force required to pull the wire from the terminal is at least equal to the ultimate tensile strength of the wire.

Still another object of the invention is to provide a terminal wire crimp in which the cross sectional area of the crimped portion of the wire is substantially equal to the cross sectional area of the undisturbed wire.

A still further object of the invention is to provide a terminal wire crimp in which the crimp is formed by smoothly longitudinally joggling a portion of the terminal about the wire to prevent injury to the wire while at the same time providing a high pull-out strength.

An additional object of the invention is to provide a terminal connector wire crimp according to the foregoing objects in which one portion of the terminal is crimped about the bare wire and another portion is crimped about the adjacent insulated wire.

An important object of the invention is to provide a method for forming an improved high pull-out strength terminal wire crimp.

Another object of the invention is to provide a method for forming a terminal wire crimp in which the force required to pull the wire from the terminal is at least equal to the ultimate tensile strength of the wire.

A further object of the invention is to provide a method for forming a terminal wire crimp without reducing the strength of the crimped wire.

Still another object of the invention is to provide a high pull-out strength terminal wire crimp which is formed without substantially reducing the cross section of the wire in the crimped section.

Other objects, features and advantages will be apparent from the foregoing detailed description taken in conjunction with the accompanying drawings, in which:

Figure 10 is a perspective view of a die set for crimping a terminal connector according to Figures 1–5 to a section of wire and illustrating a partly formed terminal connector in place on the die set before the crimping operation is performed;

Figure 11 is a perspective view similar to Figure 10 but showing the die set in the closed position immediately after performing the crimping operation;

Figure 12 is a perspective view of a die set for crimping a terminal connector according to Figures 6–9 and illustrating a terminal connector in place in the die set before performance of the crimping operation;

Figure 13 is a perspective view similar to Figure 12 but showing the die set in the closed position immediately after performing the crimping operation;

Figure 14 is a perspective view of the bottom portion of the die set shown in Figures 12–13; and Figure 15 is an end elevational view of the upper portion of the die set of Figures 12 and 13.

Figure 1:
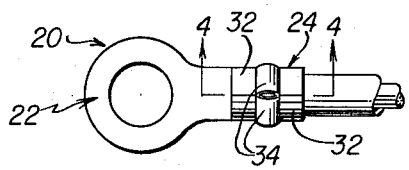
Figure 1 is a top elevational view of a terminal connector which is crimped to a bare section of an insulated wire.
Figure 2:
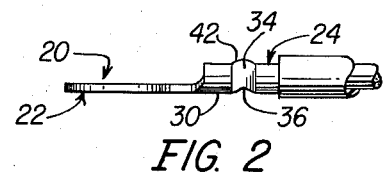
Figure 2 is a side elevational view of the terminal connector of Figure 1.
Figure 3:
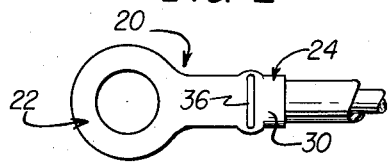
Figure 3 is a bottom elevational view of the terminal connector of Figure 1.
Figure 6:
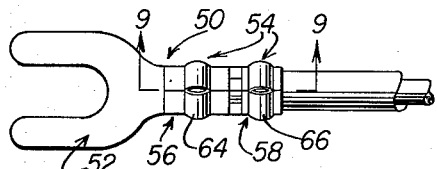
Figure 6 is a top elevational view of a second embodiment of terminal connector according to the present invention, in which the connector is crimped about a section of bare wire and also crimped about the section of insulated wire adjacent to the bare wire.
Figure 7:
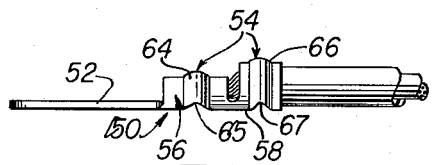
Figure 7 is a side elevational view of the terminal connector shown in Figure 6.
Figure 8:
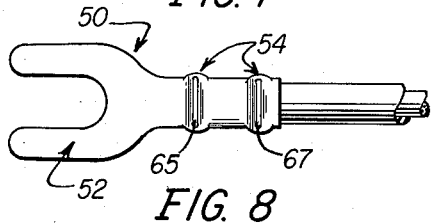
Figure 8 is a bottom elevational view of the terminal connector shown in Figure 6.

The terminal wire connector illustrated in Figures 1–5, 10 and 11 is generally designated by the reference numeral 20. The terminal is formed of sheet metal of good electrical conductivity and includes a contact portion 22 and an integral wire grip portion 24. While the contact portion shown is of the type for connecting to a terminal post or the like (not shown), it should be understood that any desired type of contact portion may be employed.

According to the present invention, the wire grip portion 24 has a tube-like configuration wrapped about a bare wire section 26 of an insulated electrical wire 28. The tube-like wire grip portion has a longitudinal flat side or floor 30 having a pair of integral ears 32—32 arcuately formed over the flattened floor 30, so that the free ends of the ears abut one another thereby providing the tube-like shape.

In order to firmly secure the bare wire portion 26 in the tube-like wire grip portion 24, a joggle 34 is formed in longitudinal profile. The joggle 34 is provided by forming a transverse indentation 36 across the flat floor 30 and by holding the remainder of the tube-like portion on each side of the section to be joggled. The formation of the joggle 34 provides a smooth dimple or ridge 38 within the wire grip portion resulting in a smooth joggle or wave in the wire section 26 conforming to the dimple 38. A generally conforming internal indentation 40 is formed within the ears 32 resulting in the formation of an external, smoothly rounded ridge 42 on the external surfaces of the ears 32.

The wire gripping joggle 34 has sufficient depth or, in other words, is sufficiently offset with respect to the main portion of the wire grip portion 24 that the wire is firmly gripped therein. However, the joggle is of smooth wave configuration so that the wire is not abruptly bent in longitudinal profile. In addition, the cross sectional internal area within the wire grip portion 24 is substantially constant throughout its length and this area is substantially equal to the undisturbed cross sectional area of the conductor wire spaced from the terminal. Thus, when the wire grip portion is crimped and the joggle 34 is formed, the shape of the bare wire is changed to conform to the internal cross sectional area of the wire grip portion, but the wire cross sectional area remains constant.

Figure 4:
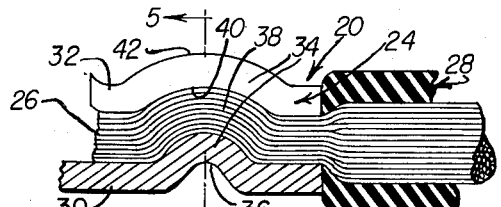
Figure 4 is an enlarged fragmentary sectional view taken along line 4—4 of Figure 1.
Figure 9:
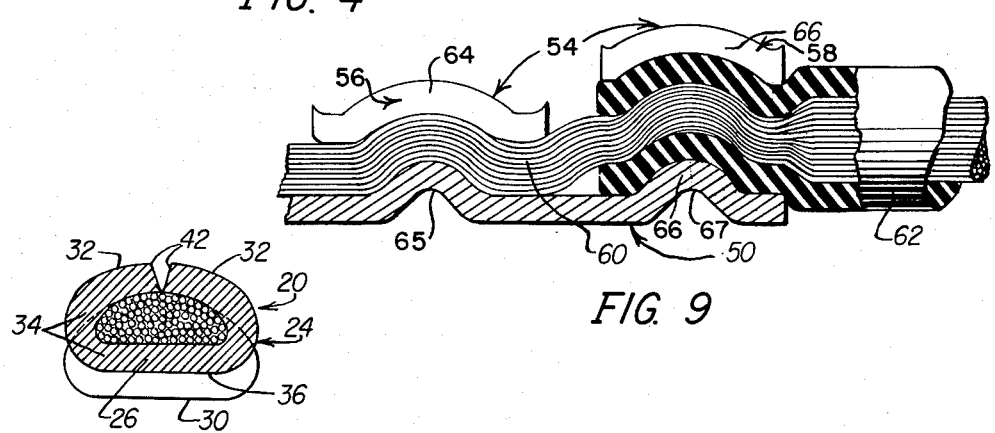
Figure 9 is an enlarged fragmentary sectional view taken along line 9—9 of Figure 6.
Figure 5:
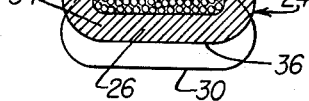
Figure 5 is a sectional view taken along line 5—5 of Figure 4.

These features are particularly important when a stranded wire 26 is utilized, as illustrated in Figures 4 and 5. The various strands of the wire are displaced but they are not deformed or crushed together as they are in wire crimps of the prior art. Since the strands are not drastically displaced and are not pierced by a tab or the like, none of the strands are broken. As a result, the original strength of the wire is retained.

In Figures 6–9 another embodiment of the invention is illustrated. The terminal connector of this embodiment is generally designated by the reference numeral 50 and includes a contact portion 52 and an integral wire grip portion 54. The terminal is formed of sheet metal of good electrical conductivity. The particular contact portion illustrated in this instance is of the open-end terminal post connector type, but it will be understood that any desired type of contact portion could be utilized.

The wire grip portion 54 includes a bare wire grip portion 56 and an insulated wire grip portion 58. The bare wire grip portion is substantially identical to the wire grip portion 24 of the previous embodiment and is crimped about a bare wire section 60 of an insulated electrical wire 62 by means of a smooth joggle 64 formed in longitudinal profile. The joggle is formed, as before, by providing a transverse indentation 65 while holding the remainder of the tube-like portion on each side of the section to be joggled.

In order to additionally secure the terminal to the wire and to prevent undue flexing at the critical section of the wire at the juncture of the bare wire portion with the end of the insulation, the insulated wire grip portion 58 is formed about the insulated end of the wire adjacent the bare wire section 60. The insulated wire grip portion is very similar to the bare wire grip portion except that it is larger in size to accommodate the insulation on the wire. The insulated wire is crimped forming a smooth joggle 66 in longitudinal profile of the wire grip portion 58, and the insulated wire within the wire grip portion conforms to the joggle as shown. The joggle is provided in the same manner as before by forming a transverse indentation 67. As is the case with the bare wire grip portion, the internal cross sectional area of the insulated wire grip portion is substantially constant throughout and this area is substantially equal to the cross sectional area of the undisturbed insulated wire.

The construction of this second embodiment is particularly well adapted for use with small diameter stranded insulated wires where additional support is desired.

According to the present invention, a simplified method is provided for connecting sheet metal terminal connectors to a wire. The first step is to form a sheet metal connector element as shown in Figure 10 with the contact portion completed but with the wire grip portion only partially finished. As shown in Figure 10 the ears 32 are not yet formed over the end of the wire but instead, together with the flat floor 30, provide a U-shaped cross section in the unfinished wire grip portion 24. The end of the wire to be crimped is then laid in place between the ears 32 and the ears are bent inwardly toward each other to form the tube-like configuration shown in Figures 1–5. At the same time the tube-like configuration is joggled in longitudinal profile to provide the finished construction shown in these figures. Sufficient joggle is provided that the force required to pull the wire from the tube-like wire grip portion is at least equal to the ultimate strength of the wire.

The method for forming the construction of Figures 6–9 is substantially the same but with the addition of the steps of folding over the ears of the insulated wire grip portion and then joggling this portion.

The steps of the method can be performed in a number of different ways, by hand or by machine. However, it has been found that for high production operation the use of power actuated crimping dies is desirable. In Figures 10 and 11 a crimping die set 70 is shown. The die set 70 is constructed for crimping the terminals of the type shown in Figures 1–5 and includes an upper die member 72 and a lower die member 74. The lower die member has an integral upstanding longitudinal pedestal 76 which is substantially the same width as the unfinished wire grip portion 24 shown resting on the pedestal in Figure 10. The pedestal is flat on its top surface except for a centrally located transverse rounded ridge 78.

The upper die member 72 is provided with a downwardly open longitudinal channel 80 which is slightly wider than the unfinished wire grip portion 24. At its lower marginal portions the channel 80 is provided with lead-in surfaces 82 to assist in properly aligning the wire grip portion as the die set portions are moved together. A rounded upper end surface 84 provides the upper surface of the channel. The shape of the channel is such, that as the die sections are brought together, the upstanding ears 32 are brought arcuately inwardly toward each other until their free ends abut to form the tube-like configuration of the finished grip portion.

The upper die portion 72 is also provided with a transverse downwardly open channel 86 which is slightly deeper than the channel 80 to thus provide a transverse cut-away section at the center of the channel 80. As the dies complete their closing movement with the free end of the ears abutting, the transverse rounded ridge 78 of the lower die member is pressed upwardly into the flat floor 30 of the terminal to form the transverse groove 36. Inasmuch as the die channel 86 provides a relief or cut-away at the center of the longitudinal channel 80, the upward pressing movement of the ridge 76 causes the entire central section of the wire grip portion to be joggled in longitudinal profile.

The terminal embodiment of Figures 6–9 is formed in a similar manner by a similar die set 90, illustrated in Figures 12–15. This die set includes a composite upper die member 92 and a lower die member 94. The lower die member is similar to the lower die member 74 except that a somewhat longer pedestal 96 is provided having a pair of spaced rounded transverse ridges 98 for forming the two transverse indentations of the wire grip portion 54.

The upper composite die member 92 includes a pair of fixedly secured portions 100 and 102. Both of these die set portions are similar to the upper die member 72 of the die set 70 except for the dimensions of the various channels. The first die portion 100 has a longitudinal channel 104 and a transverse channel 106, while the second die portion 102 is provided with a longitudinal channel 108 and a transverse channel 110. As is clearly illustrated in Figure 15, the channels of the second die set portion 102 are somewhat deeper than the channels of the first die set portion, and, of course, the longitudinal channel 108 is somewhat wider in order to accommodate the greater thickness of the insulated portion of the wire.

The operation of the die set 90 is substantially identical to the operation of the die set 70 except that two wire grip portions are formed as the die set portions are brought together instead of one.

From the foregoing description it will be readily understood that the present invention provides an improved terminal crimp in which a wire is permanently secured to the terminal by smoothly joggling the wire grip portion of the connector in longitudinal profile. The construction is such that the cross sectional area of the gripped section of wire remains substantially the same as the untouched wire, and when stranded wire is utilized the individual strands are not deformed or broken. The finished crimp connection provides a superior electrical contact, and the pull-out strength is at least equal to the ultimate tensile strength of the wire. The invention also comprehends the method for forming the improved terminal wire crimp.

Variations and modifications may be effected without departing from the scope of the novel concepts of the present invention.

We claim:

1. A terminal for connecting to a wire comprising a contact portion, and an integral sheet metal wire grip portion wrapped about a section of said wire to form a tube-like member, said tube-like member having a longitudinal flat side with a transverse indentation formed in said side to provide a smooth longitudinal joggle of sufficient depth that the force required to pull the wire from the tube-like member is at least equal to the ultimate tensile strength of the wire, the internal transverse cross sectional area of said tube-like member and said section of the wire being substantially constant throughout and being substantially equal to the transverse cross sectional area of the undisturbed wire spaced from said section, and the internal transverse cross sectional shape of the tube-like member and said enclosed section of the wire being substantially different from the transverse cross sectional shape of said undisturbed wire.

2. A terminal for connecting to a wire comprising a contact portion, and a sheet metal integral tube-like wire grip portion receiving a section of the wire, said wire grip portion having a section smoothly joggled in longitudinal profile to retain the wire, the internal transverse cross sectional area of said wire grip portion being substantially constant throughout and being substantially equal to the transverse cross sectional area of the undisturbed wire spaced from said section, and the internal transverse cross sectional shape of said wire grip portion being substantially changed from the transverse cross sectional shape of said undisturbed wire.

3. A method for connecting a sheet metal terminal to a wire comprising the steps of forming a sheet metal element having a contact portion and an integral portion of U-shaped cross section with a pair of opposed ears, forming said ears about a section of the wire to provide a tube-like member with the free ends of the ears adjacent one another, and smoothly joggling the tube-like member in longitudinal profile and substantially changing the internal transverse cross sectional shape of the tube-like member and the enclosed wire a sufficient amount that the force required to pull the wire from the tube-like member is at least equal to the ultimate tensile strength of the wire while maintaining the transverse cross sectional area of the wire throughout the tube-like member substantially the same as the transverse cross sectional area of the undisturbed wire spaced from said section.

4. A method for connecting a sheet metal terminal to a wire comprising the steps of forming a generally tube-like portion of the terminal about a section of the wire, forming a flat longitudinal side on said tube-like portion to substantially change the internal transverse cross sectional shape of the tube-like portion and the transverse cross sectional shape of the enclosed wire, forming a transverse groove across said flat side to provide a smooth joggle in longitudinal profile to retain the wire therein while maintaining the transverse cross sectional area of the wire throughout the tube-like portion substantially the same as the transverse cross sectional area of the undisturbed wire spaced from said section.

5. A method for connecting a sheet metal terminal to an insulated electrical current carrying wire comprising the steps of forming a generally tube-like portion of the terminal about a section of bare conductor wire, forming a second generally tube-like portion of the terminal about an adjacent section of insulated wire, smoothly joggling the first tube-like portion in longitudinal profile and substantially changing the internal transverse cross sectional shape of the first tube-like portion and the enclosed bare conductor wire to retain the bare wire therein while maintaining the transverse cross sectional area of the bare wire throughout the first tube-like portion substantially the same as the transverse cross sectional area of the undisturbed conductor wire spaced from said sections, and smoothly joggling the second tube-like portion in longitudinal profile and substantially changing the internal transverse cross sectional shape of the second tube-like portion and the enclosed insulated wire to retain the insulated wire therein while maintaining the transverse cross sectional area of the insulated wire throughout the second tube-like portion substantially the same as the transverse cross sectional area of said undisturbed insulated wire spaced from said sections.

6. A method for connecting a sheet metal terminal to an insulated electrical current carrying wire comprising the steps of forming a sheet metal element having a contact portion and first and second integral portions of U-shaped transverse cross section each having a pair of opposed ears, forming the ears of said first integral portion about a section of bare conductor wire to provide a first tube-like member with the free ends of the ears adjacent one another, forming the ears of the second integral portion about a section of insulated wire to provide a second tube-like member with the free ends of the ears adjacent one another, smoothly joggling the first tube-like member in longitudinal profile and substantially changing the internal transverse cross sectional shape of the first tube-like member and the enclosed bare conductor wire a sufficient amount that the force required to pull the bare wire from the first tube-like member is at least equal to the ultimate strength of the wire while maintaining the transverse cross sectional area of the bare conductor wire throughout the first tube-like member substantially the same as the transverse cross sectional area of the undisturbed conductor wire spaced from said sections, and smoothly joggling the second tube-like member in longitudinal profile and substantially changing the internal transverse cross sectional shape of the second tube-like member and the enclosed insulated wire to retain the insulated wire therein while maintaining the transverse cross sectional area of the insulated wire throughout the second tube-like member substantially the same as the transverse cross sectional area of said undisturbed insulated wire spaced from said sections.

7. A terminal for connecting to an insulated electrical current carrying wire comprising a contact portion, an integral sheet metal tube-like bare wire grip portion receiving a length of bare conductor wire and having a section smoothly joggled in longitudinal profile to retain the bare conductor wire, said bare wire grip portion having a substantially constant internal transverse cross sectional area which is substantially equal to the transverse cross sectional area of the undisturbed conductor wire spaced from the terminal and an internal transverse cross sectional shape which is substantially changed from the transverse cross sectional shape of said undisturbed conductor wire, and an integral sheet metal tube-like insulated wire grip portion receiving a length of insulated wire and having a section smoothly joggled in longitudinal profile to retain the insulated wire, said insulated wire grip portion having a substantially constant internal transverse cross sectional area which is substantially equal to the transverse cross sectional area of said undisturbed insulated wire spaced from the terminal and an internal transverse cross sectional shape which is substantially changed from the transverse cross sectional shape of said undisturbed insulated wire.

References Cited in the file of this patent

UNITED STATES PATENTS

| | | |
|---|---|---|
| 1,789,951 | Terrell et al. | Jan. 20, 1931 |
| 2,008,227 | Reilly | July 16, 1935 |
| 2,226,849 | Douglas | Dec. 31, 1940 |
| 2,276,140 | Andren et al. | Mar. 19, 1942 |
| 2,327,650 | Klein | Aug. 24, 1943 |
| 2,410,321 | Watts | Oct. 29, 1946 |
| 2,429,585 | Rogoff | Oct. 21, 1947 |
| 2,552,392 | Batcheller | May 8, 1951 |

FOREIGN PATENTS

| | | |
|---|---|---|
| 411,899 | Germany | Apr. 19, 1925 |